United States Patent [19]

McDaniel

[11] Patent Number: 4,760,100

[45] Date of Patent: Jul. 26, 1988

[54] TEREPHTHALIC ESTER POLYOLS MODIFIED WITH ETHOXYLATED AMINES AND AMIDES AND RIGID FOAMS THEREFROM

[75] Inventor: Kenneth G. McDaniel, Austin, Tex.

[73] Assignee: Arco Chemical Company, Newtown Square, Pa.

[21] Appl. No.: 113,642

[22] Filed: Oct. 26, 1987

[51] Int. Cl.$^4$ .............................................. C08G 18/14
[52] U.S. Cl. .................................. 521/137; 521/48.5; 521/157; 521/164; 521/167; 528/291; 528/301; 525/437
[58] Field of Search ............... 521/137, 157, 164, 167, 521/48.5; 528/291, 301; 525/437, 439

[56] References Cited

U.S. PATENT DOCUMENTS

| | | | |
|---|---|---|---|
| 2,683,730 | 7/1954 | Seeger | 260/453 |
| 2,834,748 | 5/1958 | Bailey | 260/42 |
| 2,846,458 | 8/1958 | Haluska | 260/448.2 |
| 2,917,480 | 12/1959 | Bailey | 260/42 |
| 2,948,757 | 8/1960 | Pruitt | 260/615 |
| 2,950,263 | 8/1960 | Abbotson | 260/2.5 |
| 3,000,963 | 9/1961 | Speranza | 260/615 |
| 3,012,008 | 12/1961 | Lester | 260/75 |
| 3,072,582 | 1/1963 | Frost | 260/2.5 |
| 3,297,597 | 1/1967 | Edwards | 260/2.5 |
| 3,344,162 | 9/1967 | Rowton | 260/453 |
| 3,362,979 | 1/1968 | Brentley | 260/453 |
| 3,647,759 | 3/1972 | Walker | 260/75 |
| 4,039,487 | 8/1977 | Kolokowski | 260/2.5 |
| 4,048,104 | 9/1977 | Svoboda | 260/2.5 |
| 4,092,276 | 5/1978 | Narayan | 260/2.5 |
| 4,137,265 | 1/1979 | Edwards | 260/570 |
| 4,223,068 | 8/1980 | Carlstrom | 428/310 |
| 4,237,238 | 12/1980 | DeGuiseppi | 521/131 |
| 4,246,364 | 1/1981 | Kochler | 521/167 |
| 4,246,365 | 1/1981 | Wiedermann | 521/172 |
| 4,442,237 | 4/1984 | Zimmermann et al. | 521/48.5 |
| 4,469,824 | 9/1984 | Grigsby, Jr. | 521/173 |
| 4,485,196 | 11/1984 | Speranza | 521/172 |
| 4,642,319 | 2/1987 | McDaniel | 521/175 |
| 4,644,019 | 2/1987 | McDaniel | 521/173 |

OTHER PUBLICATIONS

Polyurethanes—Looking Ahead to the Eighties; Proceedings of the S.P.I. 25th Annual Urethane Division Technical Conference; Joseph M. Hughes and John L. Clinton; Sponsored by the Urethane Division The Society of the Plastics Industry Inc.; Oct. 29, 30, and 31, 1979.

Primary Examiner—Maurice J. Welsh
Attorney, Agent, or Firm—Steve Rosenblatt; David Mossman

[57] ABSTRACT

The preparation of isocyanurate foams from a recycled polyethylene terephthalate polyol modified with alkoxylated amines and alkoxylated amides is disclosed. These modified foams exhibit improved fluorocarbon solubility, and do not cause the resultant polyols to be monofunctional, but rather difunctional. The foams may be used for building, roofing and sheathing applications.

17 Claims, No Drawings

TEREPHTHALIC ESTER POLYOLS MODIFIED WITH ETHOXYLATED AMINES AND AMIDES AND RIGID FOAMS THEREFROM

FIELD OF THE INVENTION

The invention relates to modified terephthalic ester polyols useful in preparing rigid polyurethane and polyisocyanurate foams. More particularly, the invention is a mixture of terephthalic ester based polyols modified with alkoxylated amines and alkoxylated amides.

BACKGROUND OF THE INVENTION

It is known to prepare polyurethane foam by the reaction of a polyisocyanate, a polyol and a blowing agent, such as a halogenated hydrocarbon, water or both, in the presence of a catalyst. One particular area of polyurethane technology is based on rigid polyurethane foams.

U.S. Pat. No. 4,469,824 to Grigsby, et al., issued Sept. 4, 1984, describes polyols produced by reacting scrap polyethylene terephthalate (PET) with diethylene glycol and one or more oxyalkylene glycols and stripping out some of the ethylene glycol present. The mole ratio of glycols to scrap PET is greater than 1.2:1. These polyols are reacted with a polyisocyanate to produce polyurethane foams.

Rigid foams generally have good insulative properties and are thus desirable for use in building insulation. As with all building materials, it is desirable to provide rigid foams that are as fire resistant as possible. One approach to this goal is to modify the polyol.

Polyisocyanate foams are a type which are considered to be fire resistant and show low smoke evolution on burning. However, polyisocyanurate foams tend to be brittle or friable. Various types of polyols have been devised to lower the foam friability, but what frequently happens is that the fire and smoke properties of the polyisocyanurate foam deteriorate. Thus, a fine balance exists between the amount and type of polyol one adds to a polyisocyanurate foam formulation in order to maintain maximum flame and smoke resistance while at the same time reach an improvement in foam friability. U.S. Pat. Nos. 4,039,487 and 4,092,276 describe attempts at this fine balance, although each has its disadvantages.

Scrap polyalkylene terephthalate, such as scrap PET, is known to be incorporated into polyurethanes. For example, U.S. Pat. No. 4,048,104 teaches that polyisocyanate prepolymers for use in polyurethane products may be prepared by combining an organic polyisocyanate with polyols which are the hydroxyl-terminated digestion products of waste polyalkylene terephthalate polymers and organic polyols. A polyol ingredient which is the digestion product of polyalkylene terephthalate residues or scraps digested with organic polyols is also described in U.S. Pat. No. 4,223,068. Another example where terephthalic acid residues are employed is outlined in U.S. Pat. No. 4,246,365 where polyurethanes are made from polyesters containing at least two hydroxyl groups and terephthalic acid residues.

In U.S. Pat. No. 4,237,238 a polyol mixture is prepared by the transesterification of a residue from the manufacture of dimethyl terephthalate with a glycol, which is then used to produce polyisocyanurate foams having a combination of a high degree of fire resistance with low smoke evolution, low foam friability and high compressive strength. The preparation of such a polyol mixture, such as from ethylene glycol and dimethyl terephthalate esterified oxidate residues, is described in U.S. Pat. No. 3,647,759. J. M. Hughes and John Clinton, in the Proceedings of the S.P.I. 25th Annual Urethane Division Technical Conference, Scottsdale, Ariz., October, 1979, describe other foams prepared from the polyols of U.S. Pat. No. 3,647,759.

Another type of polyisocyanurate foam employs a polyol blend using both amide diols and primary hydroxyl polyols to give a foam having a high reaction exotherm, making it particularly suited to the preparation of polyisocyanurate foam laminates, according to U.S. Pat. No. 4,246,364.

However, another major factor with the use of the polyester polyols described above in producing foams is that they have a limited solubility in the widely used halogenated hydrocarbon blowing agents, such as fluorocarbon 11, which is used to expand the foam and provide its insulating characteristics. It would be beneficial if a procedure could be found by which these polyester polyols could be made more soluble in halogenated hydrocarbon blowing agents.

Other methods are known for increasing the solubility of these polyester polyols in halogenated hydrocarbon blowing agents. For example, U.S. Pat. No. 4,642,319 describes modifying recycled polyethylene terephthalate polyols with aromatic amino polyols, sucrose polyols, ethoxylated alpha-methyl glucosides, alkoxylated glycerine or alkoxylated sorbitol. Additionally, U.S. Pat. No. 4,644,019 teaches modifying a recycled polyethylene terephthalate polyol with polyethoxylated nonylphenol to increase halogenated hydrocarbon solubility. However, a disadvantage with using the ethoxylates of nonylphenol is that the ethoxylate is monofunctional, that is, a monofunctional polyester is created. This polyester would act as a chain stopper during a polymerization reaction, which is not desired.

SUMMARY OF THE INVENTION

Accordingly, it is an object of the present invention to provide modified terephthalic ester polyols which have an improved solubility in halogenated hydrocarbon blowing agents.

It is another object of the present invention to provide modified terephthalic ester polyols with improved halogenated hydrocarbon solubility which would not involve modifying the terephthalic ester polyols with a monofunctional component that would create a monofunctional polyol that would serve as a chain stopper in subsequent polymerization reactions.

It is yet another object of the invention to provide modified terephthalic ester polyols with improved halogenated hydrocarbon solubility which would not cause other serious disadvantages in the production of polyisocyanurate and polyurethane foams.

In carrying out these and other objects of the invention, there is provided, in one form, a terephthalic ester polyol produced by reacting a terephthalic component which is either polyethylene terephthalate, recycled polyethylene terephthalate, terephthalic acid residues and mixtures thereof, with a difunctional component such as alkoxylated amines, alkoxylated amides and mixtures thereof.

DETAILED DESCRIPTION OF THE INVENTION

It has been discovered that rigid foams may be made using the mixture of modified terephthalic ester polyols of this invention either alone or as a polyol extender together with other polyols. These modified terephthalic ester polyols are reacted in the presence of a blowing agent and a catalyst, with an organic polyisocyanate to make foams which exhibit physical properties which make them useful for applications such as isocyanurate panels for roofing applications and sheathing building applications. These inventive polyols are noted for their fluorocarbon solubility.

The novel modified terephthalic ester polyols are made by using recycled polyethylene terephthalate (PET). This may be any scrap residue from old polyethylene terephthalate which contains compounds having the moiety:

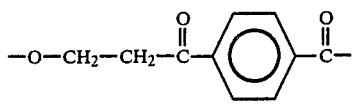

Generally, the scrap or recycled polyethylene terephthalate may be in any particulate form. A frequently seen form is fragmentized soft drink bottles which appear as clear or colored chips. Polyethylene film can also be recycled. Any chopping or pulverizing process which produces small bits of solid PET from the larger, waste recycled article would be appropriate to produce scrap PET useful herein. Sometimes the scrap PET is mixed with a solvent to make a kind of slurry. While scrap PET slurry could be used in the method of this invention, the recycled PET chips without the solvent is also useful.

The recycled PET is simultaneously, or in either order, reacted with ethoxylated alkylphenol and boiling oxyalkylene glycols. Reaction with oxyalkylene glycols forms low molecular weight dihydroxy esters of terephthalic acid. Ordinarily, these diesters of ethylene glycol are quite crystalline and separate from solution as solids. Of course, the preferred products are the aromatic polyester polyol-type compounds.

In one embodiment, the oxyalkylene glycol has the formula:

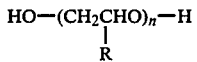

where R is hydrogen or lower alkyl of one to four carbon atoms and n is from 2 to 10. The glycol may be a residue or a flash-separated glycol. Glycols which meet this definition are diethylene glycol (DEG), dipropylene glycol, triethylene glycol (TEG), tripropylene glycol and tetrapropylene glycol, among others.

In one embodiment, DEG is one of the oxyalkylene glycol reactants. Among oxyalkylene glycol may be present as a co-reactant to help prevent the solids from setting out. Any single oxyalkylene glycol or mixture thereof can be used as the additional co-reactant with the DEG. These may include propylene glycol and higher molecular weight ethylene glycols, but not monoethylene glycol which is already present in the PET scrap residue in excess and must be stripped from the reaction mixture. Homogeneous polyesters have been prepared with dipropylene glycol without any diethylene glycol. Although exact proportions of these oxyalkylene glycols is not important, in one embodiment the DEG portion is the largest of the oxyalkylene glycol proportions.

It is preferred that the mole ratio of all of the glycols to PET scrap is greater than 1.2:1. It has been shown (e.g. U.S. Pat. No. 4,469,824 issued Sept. 4, 1984, to Grigsby, Jr. et al., incorporated herein by reference) that when this reactant mole ratio is equal to or less than 1.2:1, solids come out of the mixture after it is left standing.

The third important feature of the process for making the mixtures of this invention is the stripping of ethylene glycol (EG) during the reaction. The EG is derived from the PET during the reaction and contributes to the creation of the solids which tend to precipitate out when the mixtures are left standing. Preferably, at least 5 wt. % of the charged reactants should be taken out as overhead, and at least 25 wt. % of this overhead is EG. A particular embodiment of the invention has 15 to 25% of the charge stripped out as overhead, and, in another embodiment, 17 to 20 wt. % is taken out as overhead.

The temperature of the preparation process should be from about 190° to 280° C. Preferably, the temperature runs from about 210° to 245° C. The pressure should generally range from 1 to 40 atmospheres. No catalyst is necessary for this preparation. The mixture of terephthalic ester polyols should have a hydroxyl number in the range from 100 to 500, with a preferred range between 200 and 400.

The functionality of the product may be increased by including one or more additives into the reaction to make the terephthalic ester polyol mixtures. Such additives include alpha-methyl glucoside (AMG), glycerine, triethanolamine, diethanolamine, sorbitol and the like. Typically, the additive is present in an amount ranging from about 1 to 5 wt. % based on the total reactant charge, although larger proportions could be used. It was found that use of excess glycerine tended to cause the undesirable precipitation of solids. If glycerine is used as a functionality-enhancing additive, it should be used in proportions up to about 10 wt. %.

As mentioned earlier, a problem with prior art polyester polyols made from terephthalic components such as polyethylene terephthalate, recycled polyethylene terephthalate, terephthalic acid residues and mixtures thereof is that they have a limited solubility in the halocarbon blowing agents that are used in such foams. Some prior art modifiers of the terephthalic component have been monofunctional, which are disadvantageous in that they produce polyols which serve as chain stoppers. It has been discovered that modifying these terephthalic components with a difunctional compound such as alkoxylated amines and alkoxylated amides will provide the terephthalic ester polyol with increased halocarbon solubility, and further will not give a polyol which serves as a chain stopper during the polymerization reaction. In one embodiment, the modifiers are ethoxylated amines and ethoxylated amides. The alkoxy moiety of these modifiers may be ethoxy, propoxy, butoxy or mixtures thereof.

It is expected that any ethoxylates of alkyl amides and alkyl amines, including those alkyl amines wherein the amine group is separated from the alkyl groups by ether or other linkages. These components were discovered to be useful in modifying polyesters prepared either from terephthalic acid, phthalic acid or alkyl diacids such as adipic acid and to polyesters prepared from mixtures of the acids. It is also expected that esters containing these ethoxylates could be prepared (1) either in a single step process in which the acid; ester, such as dimethyl terephthalates and polyethylene terephthalate; are combined in one step with the glycol and amine or amide ethoxylates, or (2) the modified polyester could be prepared by first preparing a polyester polyol and then incorporating the alkoxylated material as given in the following examples.

The terephthalic ester polyol mixture is modified by reaction with about 1 wt.% to 40 wt.% of the fluorocarbon solubilizing agent described above. As with the reaction to make the terephthalic ester polyol, no catalyst is required to make the useful modified terephthalic ester polyols of the present invention.

These modified ester polyol mixtures can serve as polyol extenders when they are blended with conventional polyols for use in polyurethane foams. The polyols of this invention can also be used alone to prepare polyisocyanurate foams.

There is good compatibility of the ester polyols of this invention with trichlorofluoromethane. Trichlorofluoromethane, sold under the trade name Freon® R-11B, a conventional blowing agent, is the gas entrapped in closed-cell rigid foams which accounts for the excellent insulating properties of these foams.

The second constituent of the overall polyol combination found particularly useful in preparing rigid polyurethane foams is a polyether polyol having a hydroxyl number of 200 to 800. Usually, the polyether polyol comprises 0 to 95 percent by weight of the total polyol combination weight. In one embodiment, the polyether polyols of this type are the reaction products of a polyfunctional active hydrogen initiator and propylene oxide, ethylene oxide or mixed propylene oxide and ethylene oxide. The polyfunctional active hydrogen initiator most preferred has a functionality of from 2 to 8.

A wide variety of initiators may be alkoxylated to form useful polyether polyols. Thus, for example, polyfunctional amines and alcohols of the following type may be alkoxylated: monoethanolamine, diethanolamine, triethanolamine, ethylene glycol, polyethylene glycol, propylene glycol, polypropylene glycol, glycerine, sorbitol, trimethylolpropane, sucrose and alphamethyl glucoside.

Such above amines or alcohols may be reacted with an alkylene oxide such as ethylene oxide, propylene oxide or mixed ethylene oxide and propylene oxide using techniques known to those skilled in the art. Thus, for example, the reaction of alkylene oxide with initiators of this type is set forth in U.S. Pat. Nos. 2,948,757 and 3,000,963. Essentially, such alkoxylations are carried out in the presence of a basic catalyst at a temperature sufficient to sustain the reaction. The hydroxyl number which is desired for the finished polyol would determine the amount of alkylene oxide used to react with the initiator. As noted above, the polyether polyols useful here have a hydroxyl number ranging from about 200 to about 800. The reaction mixture is then neutralized and water and excess reactants are stripped from the polyol. The polyether polyol may be prepared by reacting the initiator first with propylene oxide followed by ethylene oxide or vice versa in one or more sequences to give a so-called block polymer chain, or by reacting the initiator at once with a propylene oxide and ethylene oxide mixture to achieve a random distribution of such alkylene oxides.

In one embodiment, the second polyol constituent is selected from the nitrogen-containing polyether polyols described in U.S. Pat. Nos. 3,297,597 and 4,137,265, incorporated by reference herein. These polyols have been marketed as Thanol® R-350-X and Thanol® R-650-X polyols. These polyols are prepared by reacting from 2 to 3 moles of propylene oxide with one mole of the Mannich reaction product of a mole of phenol or nonylphenol with one or two moles of diethanolamine and formaldehyde.

The final polyol combination for polyurethane foams comprises 0 to 95 percent by weight of said polyether polyol and 100 to 5 percent by weight of terephthalic ester polyol mixtures of this invention. Although the liquid terephthalic ester polyols of this invention may be used alone, it is preferred that they be present in an amount of from 30 to 70 wt.% of the polyol blend. For isocyanurate foams, the liquid terephthalic ester polyol is used alone or together with blends of polyester polyols and polyether polyols. The polyol combination in many instances has a total hydroxyl number ranging from about 100 to about 500.

Any aromatic polyisocyanate may be used in the practice of the instant invention. Typical aromatic polyisocyanates include m-phenylene diisocyanate, p-phenylene diisocyanate, polymethylene polyphenylisocyanate, 2,4-toluene diisocyanate, 2,6-toluene diisocyanate, dianisidine diisocyanate, bitolylene diisocyanate, naphthalene-1,4-diisocyanate, diphenylene-4,4'-diisocyanate, aliphatic-aromatic diisocyanates, such as xylylene-1,4-diisocyanate, xylylene-1,2-diisocyanate, xylylene-1,3-diisocyanate, bis(4-isocyanatophenyl)methane, bis(3-methyl-4-isocyanatophenyl)methane, and 4,4'-diphenylpropane diisocyanate.

Greatly preferred aromatic polyisocyanates used in the practice of the invention are methylene-bridged polyphenyl polyisocyanate mixtures which have a functionality of from about 2 to about 4. These latter isocyanate compounds are generally produced by the phosgenation of corresponding methylene bridged polyphenyl polyamines, which are conventionally produced by the reaction of formaldehyde and primary aromatic amines, such as aniline, in the presence of hydrochloric acid and/or other acidic catalysts. Known processes for preparing the methylene-bridge polyphenyl polyisocyanates and corresponding methylene-bridged polyphenyl polyisocyanates therefrom are described in the literature and in many patents; for example, U.S. Pat. Nos. 2,683,730; 2,950,263; 3,012,008; 3,344,162; and 3,362,979.

Most preferred methylene-bridged polyphenyl polyisocyanate mixtures used here contain from about 20 to about 100 wt.% methylene diphenyl diisocyanate isomers with the remainder being polymethylene polyphenyl diisocyanates having higher functionalities and higher molecular weights. Typical of these are polyphenyl polyisocyanate mixtures containing about 20 to 100 wt.% methylene diphenyl diisocyanate isomers, of which 20 to about 95 wt.% thereof is the 4,4'-isomer with the remainder being polymethylene polyphenyl polyisocyanates of higher molecular weight and functionality that have an average functionality of from about 2.1 to about 3.5. The isocyanate mixtures are known, commercially available materials and can be prepared by the process described in U.S. Pat. No. 3,362,979, issued Jan. 9, 1968 to Floyd E. Bentley.

In the production of rigid polyurethane foams in the practice of the invention, other known additives are necessary. One such constituent is the blowing agent. Some examples of such material are trichloromonofluoromethane, dichlorodifluoromethane, dichloromonofluoromethane, 1,1-dichloro-1-fluoromethane, 1,1-difluoro-1,2,2-trichloromethane, chloropentafluoroethane, and the like. It is anticipated that the modified terephthalic ester polyols of the present invention will have increased solubility in all of these halocarbons, in contrast with some of the prior art polyols which are made from PET residues. Other useful blowing agents include low-boiling hydrocarbons such as butane, pentane, hexane, cyclohexane, and the like. See U.S. Pat. No. 3,072,582, for example.

Surfactant agents, better known as silicone oils, are added to serve as cell stabilizers. Some representative materials are sold under the names of L-5420, L-521 and DC-193 which are, generally, polysiloxane polyoxyalkylene blocked copolymers, such as those disclosed in U.S. Pat. Nos. 2,834,748; 2,917,480; and 2,846,458, for example.

The catalysts which may be used to make the foams of this invention are well known. There are two general types of catalyst, tertiary amines and organometallic compounds. Examples of suitable tertiary amines, used either individually or in mixture, are the N-alkylmorpholines, N-alkylalkanolamines, N,N-dialkylcyclohexylamines and alkylamines where the alkyl groups are methyl, ethyl, propyl, butyl, etc. Examples of specific tertiary amine catalysts useful in this invention are triethylenediamine, tetramethylethylenediamine, triethylamine, tripropylamine, tributylamine, triamylamine, pyridine, quinoline, dimethylpiperazine, dimethylhexahydroaniline, piperazine, N-ethylmorpholine, 2-methylpiperazine, dimethylaniline, nicotine, dimethylaminoethanol, tetramethylpropanediamine and methyltriethylenediamine. Organometallic compounds useful as catalysts include those of bismuth, lead, tin, titanium, iron, antimony, uranium, cadmium, cobalt, thorium, aluminum, mercury, zinc, nickel, cerium, molybdenum, vanadium, copper, manganese, zirconium, etc. Some examples of these metal catalysts include bismuth nitrate, lead 2-ethylhexoate, lead benzoate, lead oleate, dibutyltin dilaurate, tributyltin, butyltin trichloride, stannic chloride, stannous octoate, stannous oleate, dibutyltin di(2-ethylhexoate), ferric chloride, antimony trichloride, antimony glycolate, tin glycolates, etc. Selection of the individual catalysts and proportions to use in the polyurethane reaction are well within the knowledge of those skilled in the art, and an amine and organometallic compound are often used together in the polyurethane reaction.

Catalysts particularly useful for isocyanurate foams include salts of organic acids such as sodium acetate, tetramethyl ammonium octoate, and tridimethylaminomethyl phenol.

The rigid polyurethane foams prepared here can be made in one step by reacting all the ingredients together at once (one-shot process) or the rigid foams can be made by the so-called "quasi-prepolymer method." In accordance with this method, a portion of the polyol component is reacted in the absence of a catalyst with the polyisocyanate component in proportion so as to provide from about 20% to about 40% of free isocyanate groups in the reaction product, based on the polyol. To prepare foam, the remaining portion of the polyol is added, and the two components are allowed to react in the presence of a catalyst and other appropriate additives such as blowing agents, foam stabilizing agents, fire retardants, etc. The blowing agent, the foam stabilizing agent, the fire retardant, etc., may be added to either the prepolymer or remaining polyol, or both, prior to the mixing of the component whereby at the end of the reaction a rigid polyurethane foam is provided.

In one embodiment, the amount of polyol combination is used such that the isocyanate groups are present in the foam in at least an equivalent amount, and preferably in slight excess, compared with the free hydroxyl groups. Preferably, the ingredients will be proportional so as to provide for about 1.05 to about 8.0 mole equivalents of isocyanate groups per mole equivalent of hydroxyl groups.

In another embodiment, used for making packaging foams, the equivalents of isocyanate to equivalents of hydroxyl groups may be as low as 0.2.

The invention will be illustrated further with respect to the following specific examples, which are given by way of illustration and not given as limitations on the scope of this invention.

A polyester which had been prepared from the reaction of scrap polyethylene terephthalate with diethylene glycol and dipropylene glycol according to U.S. Pat. No. 4,485,196 was used as a feed stream in the following procedures. This material had a hydroxyl number of 253.

EXAMPLE 1

Procedure for the Preparation of a Polyester Containing an Ethoxylated Amine

The apparatus for this preparation was a 2-liter, 3-neck round bottom flask equipped with a nitrogen bubbler, a mechanical stirrer, a heating mantle and a temperature controller.

The polyester prepared from polyethylene terephthalate (1050 g) was charged to the round bottom flask and was heated to 210° C. under a nitrogen atmosphere. The ethoxylated amine[1] was charged and allowed to react for one hour. Samples were taken at 0.5 and 1.0 hours for analysis by gel permeation. Gel permeation shows that the reaction is essentially complete after 0.5 hours. The product ester had a viscosity of 5070 cps at 25° C., a hydroxyl number of 202 mg KOH/g polyol, and an acid number of 3.78 mg KOH/g polyol. The product polyester had a flurocarbon solubility of less than 20%.

[1]The amine has a structure as follows:

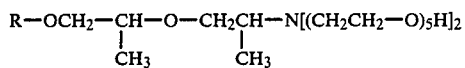

where R is an alkyl with $C_{10}$–$C_{12}$ carbon range.

EXAMPLE 2

Procedure for the Preparation of a Polyester Containing an Ethoxylated Amide

The apparatus and procedure from Example 1 were repeated, except that 525 g of the unmodified polyester was charged and 175 g WITCAMIDE ® 82[1] was charged. The product analyses are:
OH No. = 233 mg KOH/g polyol
Viscosity = 8370 cps (25° C.)

Acid number=0.27 mg KOH/g polyol

[1]WITCAMIDE 82 is described as coconut diethanolamide and is produced by Witco Chemical Corporation.

These modified polyesters were used to prepare hand mixed 600 g weight foams. The formulations, reactivities, and foam properties are as follows:

| Formulations, pbw | | |
|---|---|---|
| Polyol from Example 1 | 16.0 | — |
| Polyol from Example 2 | — | 15.9 |
| THANOL ® R-350X | 12.1 | 11.9 |
| THANOL ® R-480 | 12.1 | 11.9 |
| DC-193 | 0.4 | 0.4 |
| THANCAT ® TD-20 | 0.3 | 0.3 |
| Water | 0.3 | 0.3 |
| Fluorocarbon 11 | 10.6 | 10.6 |
| PAPI ® 580 | 48.2 | 48.7 |
| Index | 1.10 | 1.10 |
| Reactivity | | |
| Cream time (sec) | 14 | 17 |
| Gel time (sec) | 48 | 50 |
| Tack free time (sec) | 56 | 61 |
| Rise time (sec) | 88 | 93 |
| Foam Properties | | |
| Density, pcf | 2.0 | 1.9 |
| K factor (BTU-in.)/(hr.-ft$^2$-°F.) | 0.105 | 0.103 |
| Compressive Strength, psi | 46.3 | 43.6 |
| Friability, % | 0.13 | 1.3 |
| Closed cells, % | 95.7 | 95.7 |

| Dimensional stability (4 weeks) | | | | |
|---|---|---|---|---|
| % change | ΔV | ΔL | ΔV | ΔL |
| 158° F., 100% R.H. | 8.4 | 4.3 | 6.0 | 3.3 |
| 200° F., dry | 6.2 | 3.6 | 4.8 | 2.8 |

GLOSSARY

| | |
|---|---|
| THANOL ® R-350-X | An aromatic-amino polyol, hydroxyl number 350, described in U.S. Pat. No. 3,297,597, made by Arco Chemical Co. |
| THANOL ® R-480 | A sucrose-amino polyol, hydroxyl number 530, made by Arco Chemical Co. |
| Silicone DC-193 ® | A silicone surfactant made by Dow-Corning Corp. |
| THANCAT ® TD-20 | 80 wt. % dimethylamine, 20 wt. % triethylenediamine, made by Texaco Chemical Co. |
| PAPI ® 580 | Polymeric isocyanate; made by Dow Chemical Co. |
| R.H. | Relative humidity |

Many modifications may be made in the polyol mixtures of this invention and their method of production without departing from the spirit and scope of the invention, which is defined only in the appended claims. For example, one skilled in the art could adjust the temperature, pressure, reactants, proportions and modes of additions to provide polyol mixtures that give foams with optimal properties.

I claim:

1. A terephthalic ester polyol produced by reacting:
  a. a terephthalic component selected from the group consisting of polyethylene terephthalate, recycled polyethylene terephthalate, terephthalic acid residues and mixtures thereof, and
  b. a difunctional component selected from the group consisting of alkoxylated amines, alkoxylated amides and mixtures thereof.
2. The terephthalic ester polyol of claim 1 wherein the difunctional component is a 1 to 50 molar alkoxylate of an alkylamine or an alkylamine wherein the alkyl comprises 1 to 20 carbon atoms.
3. The terephthalic ester polyol of claim 1 wherein the difunctional component is selected from the group consisting of an ethoxylated amine, an ethoxylated amide or mixtures thereof.
4. The terephthalic ester polyol of claim 1 wherein the difunctional component is an amine with the structure of

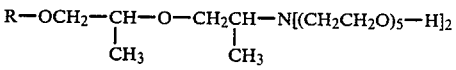

where R is an alkyl with 10 to 12 carbon atoms.

5. The terephthalic ester polyol of claim 1 wherein the terephthalic component is reacted with about 1 wt.% to 40 wt.% of the difunctional component.
6. A rigid foam obtained by reacting, in the presence of a blowing agent and a catalyst of polyisocyanurate or polyurethane formation, an organic polyisocyanate and polyol component comprising the terephthalic ester polyol of claim 1.
7. A terephthalic ester polyol produced by reacting:
  a. terephthalic component selected from the group consisting of polyethylene terephthalate, recycled polyethylene terephthalate, terephthalic acid residues and mixtures thereof, and
  b. 1 wt.% to 40 wt.% of a difunctional component selected from the group consisting of a 2 to 40 molar alkoxylate of a compound selected from the group consisting of alkyl amines, alkoxylated amides and mixtures thereof, where the alkyl group has from 1 to 20 carbon atoms.
8. The terephthalic ester polyol of claim 7 wherein the terephthalic component is reacted with about 1 wt.% to 40 wt.% of the difunctional component.
9. A rigid foam obtained by reacting, in the presence of a blowing agent and a catalyst of polyisocyanurate or polyurethane formation, an organic polyisocyanate and polyol component comprising the terephthalic ester polyol of claim 7.
10. A mixture of modified terephthalic ester polyols produced by reacting:
  a. a terephthalic component selected from the group consisting of polyethylene terephthalate, recycled polyethylene terephthalate, terephthalic acid residues and mixtures thereof;
  b. an oxyalkylene glycol of the formula:

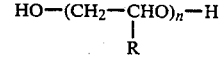

wherein R is hydrogen or alkyl of 1 to 4 carbon atoms and n ranges from 2 to 10; and
  c. about 1 to 40 wt.% of a 2 to 40 molar alkoxylate of an alkylamine or an alkylamine, wherein the alkyl is from 1 to 20 carbon atoms to form a mixture of modified terephthalic ester polyols.
11. The mixture of modified terephthalic ester polyols of claim 10 produced by reacting about 1 wt % to 40 wt.% of a 2 to 40 molar ethoxylate of an alkylamine or an alkylamide, wherein the alkyl is from 1 to 20 carbon atoms.
12. A rigid foam obtained by reacting, in the presence of a blowing agent and a catalyst of polyisocyanurate or polyurethane formation, an organic polyisocyanate and polyol component comprising the terephthalic ester polyol of claim 10.

13. A mixture of modified terephthalic ester polyols produced by a process comprising the steps of:
   a. reacting a terephthalic component; which is selected from the group consisting of polyethylene terephthalate, recycled polyethylene terephthalate, terephthalic acid residues, and mixtures thereof; with diethylene glycol and at least one or more oxyalkylene glycols of the formula:

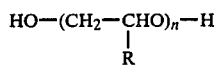

$$HO-(CH_2-CHO)_n-H$$
   $$\phantom{HO-(CH_2-}|$$
   $$\phantom{HO-(CH_2-}R$$

wherein R is hydrogen or alkyl of 1 to 4 carbon atoms and n ranges from 2 to 10, wherein the mole ratio of glycols to recycled polyethylene terephthalate is greater than 1.2:1;
   b. stripping off as overhead at least 5 wt.% of the reaction product from step a. based on the reactants charged, where at least 25% of the overhead is ethylene glycol; to form a mixture of terephthalic ester polyols of an average hydroxyl number between 100 and 500; and
   c. reacting the mixture of terephthalic ester polyols with about 1 to 40 wt.% of a difunctional component comprising a 2 to 40 molar alkoxylate of an alkylamine or an alkylamide, wherein the alkyl is from 1 to 20 carbon atoms to form a mixture of modified terephthalic ester polyols.

14. The mixture of claim 13 wherein the mixture of terephthalic ester polyols is reacted with about 1 wt.% to 40 wt.% of a 2 to 40 molar ethoxylate of an alkylamine or an alkylamide.

15. The mixture of claim 13 wherein the difunctional component is selected from the group consisting of an ethoxylated amine, an ethoxylated amide or mixtures thereof.

16. The mixture of claim 13 wherein the difunctional component is an amine with the structure of

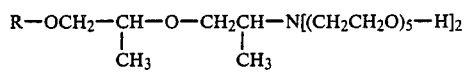

$$R-OCH_2-CH-O-CH_2CH-N[(CH_2CH_2O)_5-H]_2$$
$$\phantom{R-OCH_2-}|\phantom{-O-CH_2}|$$
$$\phantom{R-OCH_2-}CH_3\phantom{-O-}CH_3$$

where R is an alkyl with 10 to 12 carbon atoms.

17. A rigid foam obtained by reacting, in the presence of a blowing agent and a catalyst of polyisocyanate or polyurethane formation, an organic polyisocyanate and polyol component comprising the terephthalic ester polyol of claim 13.

* * * * *